H. S. SMITH.
FERTILIZER DISTRIBUTER AND PLANTER.
APPLICATION FILED SEPT. 16, 1916.
1,242,061.
Patented Oct. 2, 1917.
3 SHEETS—SHEET 1.
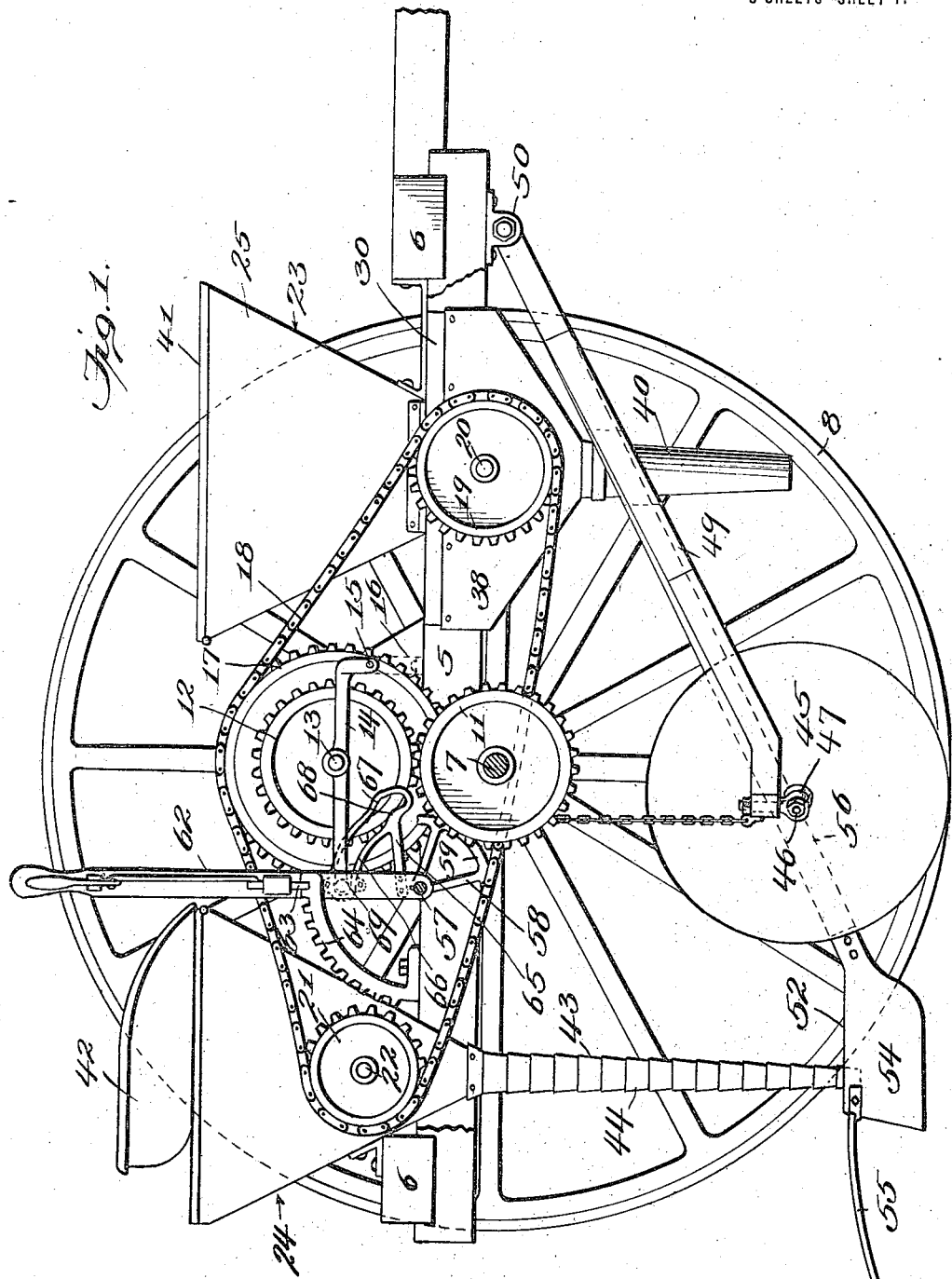

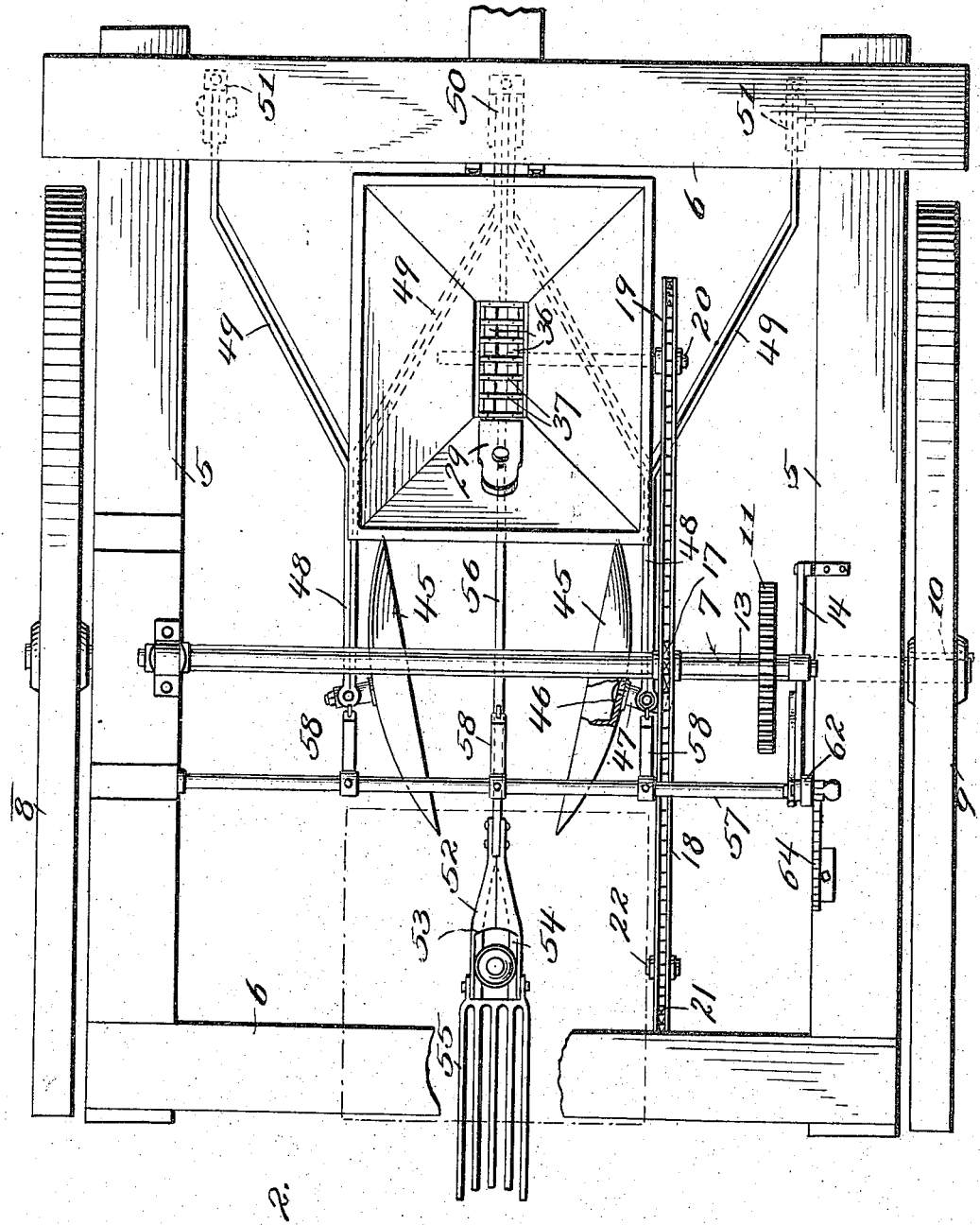

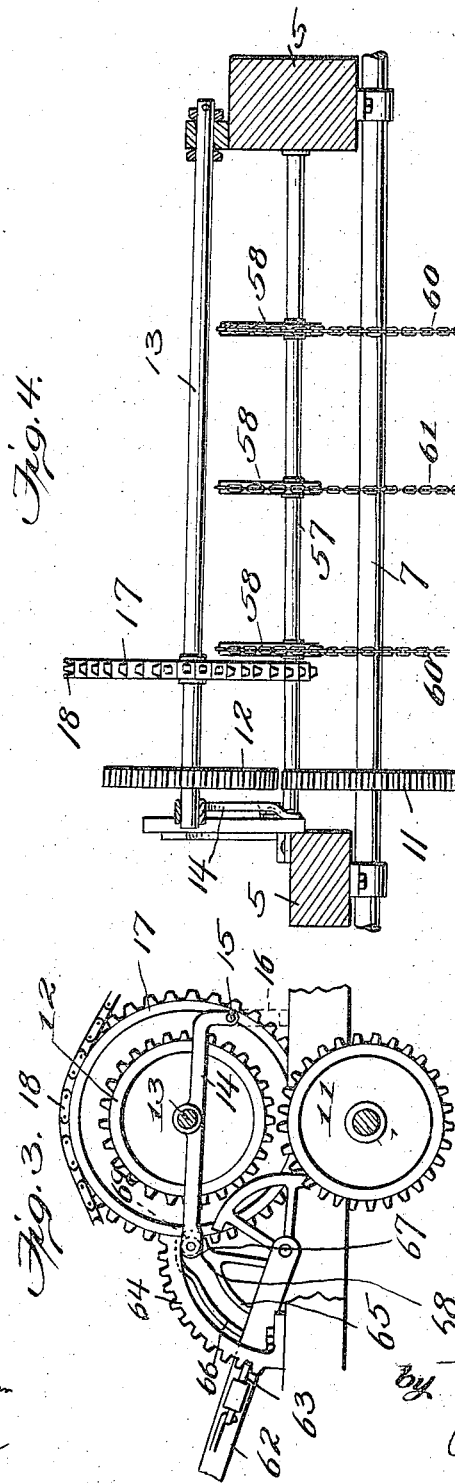

UNITED STATES PATENT OFFICE.

HAYES S. SMITH, OF ROWLAND, NORTH CAROLINA.

FERTILIZER-DISTRIBUTER AND PLANTER.

1,242,061.  Specification of Letters Patent.  Patented Oct. 2, 1917.

Application filed September 16, 1916. Serial No. 120,564.

*To all whom it may concern:*

Be it known that I, HAYES S. SMITH, a citizen of the United States, residing at Rowland, in the county of Robeson and State of North Carolina, have invented new and useful Improvements in Fertilizer-Distributers and Planters, of which the following is a specification.

This invention relates to fertilizer distributers and planters particularly adapted for fertilizing and planting cotton seed, though generally serviceable in putting other seed in the ground.

The primary object of the invention is to provide a comparatively simple and compact organization of fertilizer distributing and planting elements relatively assembled and connected by actuating mechanism for positive performance of their assigned functions and having cultivating devices in coöperation therewith to effectively form a ridge and open and close a furrow therein to successively receive fertilizer and seed and close the soil over the latter without the least waste and in an expeditious and certain manner. A further object of the invention is to provide a machine of the class specified comprising fertilizer distributing and planting elements connected for simultaneous operation together with cultivating devices and mechanism readily operable to disconnect the fertilizer distributing and planting elements from the driving mechanism and at a proper interval to elevate and clear the cultivating devices relatively to the ground surface for turning and during transportation of the machine to and from the ground to be seeded.

With these and other objects and advantages in view the invention consists in the construction and arrangement of the several parts which will be more fully hereinafter described and claimed.

In the drawings:

Figure 1 is a side elevation of a fertilizer distributer and planter embodying the features of the invention.

Fig. 2 is a top plan view of the same partially broken away and in section and having the seed box removed, but shown in dotted lines.

Fig. 3 is a detail side elevation of a part of the mechanism and particularly illustrating the means for separating the gear devices controlling the conjoint operation of the fertilizer distributer and the seed box.

Fig. 4 is a transverse vertical section of a portion of the machine and illustrating the drive axle, rock shaft carrying the lifters for the cultivating devices and the power transmitting shaft interposed between the fertilizer distributer and the seed box.

The numeral 5 designates opposite side bars or members, and 6 end bars or members suitably secured to the bars or members 5 and constituting the frame of the machine. This frame may be of any suitable form and equipped with such bracing accessories as may be necessary to strengthen the same. In suitable bearings or in any approved manner an axle 7 is mounted to rotate in relation to the intermediate portions of the side bars or members 5 of the frame, and on opposite ends of this axle or main drive shaft are carrying or ground wheels 8 and 9, the wheel 9 being shown as keyed to one end of the axle or drive shaft 7, as at 10, and the other wheel 8 is free to rotate on the said drive shaft or axle so as to accommodate turning movements of the machine or permit the latter to be readily brought about or turned at the ends of a seeding run or furrow, or at any other point that may be desired. It is immaterial which carrying or ground wheel is fast to the axle or shaft 7. In some instances the right wheel may be the one secured, and in other instances the opposite wheel may be secured to rotate with the axle or drive shaft. This mounting of the carrying or ground wheels relatively to the axle or shaft 7 will depend upon the use of the machine and the change is readily accomplished without requiring invention by the use of a suitable key adapted to be associated with either wheel and axle or shaft extremity. On the axle or shaft 7 a drive gear 11 is mounted to rotate therewith and is adapted to engage and operate a transmitting gear 12 fixed on a power transmitting shaft 13 having one extremity mounted to rotate in a horizontal supporting bar 14 fulcrumed at one end, as at 15, to an upright or support 16 held by one of the side bars or members 5 of the main frame, the shaft 13 being arranged to have an upward tilting movement at one end adjacent to which the gear 12 is mounted so as to disengage the latter gear from the main drive gear 11 for a purpose which will be more fully hereinafter explained. On the power transmitting shaft 13 is a sprocket wheel 17 which as shown is engaged by the upper portion of a chain belt 18 that passes downwardly under the axle or drive shaft 7 and engages or is trained around a sprocket wheel 19 of a fertilizer feed shaft 20 and also around a sprocket wheel 21 of a seed box feed shaft 22, and by this means the feed of the fertilizer distributer and of a seeder or seed box may be positively and simultaneously controlled and actuated. The fertilizer distributer 23 is located in the front portion of the main frame at the center, and the seed box 24 is disposed at the rear in the center of the main frame. The fertilizer distributer comprises a hopper 25 having a suitable outlet communicating with a flexible feed spout or boot 40 which depends a suitable distance below the distributing hopper to deliver the fertilizer at a proper point along the ground as the machine regularly progresses. It will be understood that the hopper 25 is provided with a suitable cover 41 and the capacity of this hopper may be varied and the general proportions of the fertilizer distributer as a whole may be modified at will.

The seed hopper 24 will be of any approved type and have therein any suitable form of seed outlet controlling devices, it being intended to use any of the valve or cup devices now commonly employed or any other seed feed control that may be hereafter devised. The seed box is of hopper form with a lower contracted or reduced extremity and an upper hinged top or lid on which a seat 42 is mounted. Depending from the lower contracted or outlet end of the seed box 24 is an automatically collapsible seed delivery spout 44 comprising a series of sheet metal frusto-conical tubes 43 which gradually diminish in size toward the lower end of the spout and are interfitted so as to move upwardly relatively to each other and then resume a normal position in accordance with the operation of other devices connected thereto.

The cultivating devices embodied in this machine comprise two furrow or ridge forming disks 45 disposed to rearwardly converge and each carrying a stud 46 held by a suitable support 47. The supports 47 of the disks are adjustably secured to the rear ends of disk carrying frames 48 having front divergent members 49 fulcrumed at the center to a bracket 50 secured to the under side of the front cross-beam or frame member 6 and also to fulcrum brackets 51 secured to the same front cross-beam or member 6 at equal distances from the longitudinal center of the machine. The disk carrying frames 48 are free to gravitate or to have free vertical riding movement during the operation of the machine, but they are of sufficient weight to hold them well down into the soil for the purpose of forming and throwing up a ridge over the fertilizer that has been distributed ahead of the positions of these disks. The rear convergence of the disks 45 heaps or suitably elevates the soil in ridge form for the reception of the seed from the seed box 25 by way of the collapsible spout 44, and in line with the longitudinal center of the machine is a furrow opener or former 52 having a top opening 53 and inwardly inclined sides or fenders 54, the lower member or end of the feed spout 44 from the seed box 24 extending downwardly into the opening 53 of the furrow opener and suitably secured to the sides or fenders 54, as shown by Fig. 2. Secured to the rear end of the furrow opener 52 is a coverer or drag 55 which as shown is preferably in the form of a rake deflected downwardly to positively draw the soil inwardly over the furrow formed and the seed deposited in the furrow. The furrow opener 52 and the coverer or drag 55 have a floating or self-gravitating mounting so as to conform to the height of the ridge and the contour of the ground surface in which the ridge is formed and insure a deposit of the seed at a uniform depth throughout the length of the ridge; and to provide for this floating or self-adjustment of the furrow opener and coverer a carrying bar 56 is secured to the front end thereof and extends upwardly to and is also fulcrumed in the center bracket 50, said carrying bar 56 being independent in its operation and movement relatively to the carrying frames 48 for the disks 45.

On the side beams or members 5 of the frame at a point slightly in rear of the gears 11 and 12, a rock shaft 57 is mounted in suitable bearings and carries a plurality of lifters 58 of segmental form or having segmental peripheries 59. There are three of these lifters, as shown by Fig. 4, and they all uniformly operate with the rock shaft 57, the uppermost lifters being connected by lifting chains 60 to the rear ends of the carrying frames 48 of the disks 45. The intermediate lifter 58 is connected by a lifting chain 61 to the carrying bar 56 for the furrow opener 52 and coverer 55. A shifting lever 62 is secured to the shaft 57 and carries a locking dog 63 for engagement with a toothed segment 64 held on one of the side beams or members 5 so that the said lever may be locked in its adjusted position. This shifting lever 62 also carries a shaft shifter consisting of an open frame 65 having an upper segmental slot 66 whose center will be the center of the rock shaft 57, the segmental slot 66 continuing into a cam slot 67 at the free end of the said frame. The cam slot 67 has a rise, as at 68, and the rear end of the shaft adjusting bar 14 is provided with a stud or roller 69 which always engages the segmental slot 66 and is movable into the cam slot 67. When the shifting lever is drawn backwardly the stud or roller 69 on the shaft shifting bar 14 rides in the segmental slot 66 and the said bar 14 is not lifted by reason of the fact that the slot 66 is concentric with relation to the fulcrum or the rock shaft 57 of the shifting lever 62. During the movement of the stud or roller 69 in the slot 66, however, the lifters 58 are operating and the lifting chains 60 and 61 are caused to be drawn upwardly and the carrying frames 48 and carrying bar 56 together with the parts supported thereby gradually elevated so that the disks 45 and the furrow opener 52 and coverer 55 are caused to clear the ground surface; and when the furrow opener 52 and coverer 55 are elevated the seed delivery spout 44 is collapsed proportionately to the elevation of the furrow opener and the coverer. Just about the time that the disks 45 and furrow opener 52 and coverer 55 have been elevated from the ground surface to their maximum elevated distances, the stud or roller 69 will have reached the cam slot 67 and instantly the bar 14 and shaft 13 as well as the gear 12 will be elevated sufficiently to disengage the teeth of the said gear 12 from the teeth of the gear 11 and thereby immediately effect a cessation of operation of the chain belt 18, the sprocket wheel 19 and shaft 20 and the sprocket wheel 21 and shaft 22 and as a consequence the distribution of the fertilizer and the dropping of the seed will be promptly checked. During the transportation of the machine or when moving it from one point to another when the distribution of fertilizer and the dropping of seed are undesirable, the disks 45 and the furrow opener 52 and coverer 55 will remain elevated, but as soon as the point is reached where it is desired to distribute the fertilizer and drop the seed the shifting lever 62 will be disposed in the position shown by Fig. 1 and thus cause a resumption of mesh of the gears 11 and 12 and operation of the shafts 20 and 22 of the fertilizer distributer and seed box, and immediately thereafter the disks 45 and furrow opener 52 and coverer 55 will be lowered into operative position.

During the progress of the machine the flexible fertilizer delivery spout 40 may ride over any obstructions with which it may come in contact and immediately resume operative position after passing such obstructions. The formation of the seed spout 44 to automatically collapse and the association of the lower extremity thereof in connection with the furrow opener as hereinbefore explained provide for a positive dropping of the seed into the furrow and an avoidance of waste of seed, and, moreover, the timed cessation of operation of the shafts 20 and 22 when the disks 45 and furrow opener 52 and coverer 55 are raised also prevents wastage or loss of fertilizer and seed, with material advantages in operation of machines of this class.

The mechanism as hereinbefore described has been arranged to operate the shafts 20 and 22 in one direction by causing the chain belt 18 to engage over the upper portion of the sprocket wheel 17, but it will be understood that the direction of movement of these parts may be quickly changed without involving invention by causing the belt 18 to engage another, or for instance the lower portion of the sprocket wheel 17, such change of point of engagement of the chain belt 18 relatively to the sprocket wheel 17 being an obvious rearrangement and such change of application of the chain belt 18 may be made without in the least modifying the remaining features of the machine.

The improved machine is very compact in its structure and organization and is comparatively simple, the parts being so disposed as to positively coöperate and to apply the power from the shaft or axle 7 in the most effective manner. The several parts of the machine are also strong and durable and are not liable to get out of order, and in view of the combination of the fertilizer distributer with the seed box in one machine together with the cultivating devices as explained a composite organization is provided which will materially reduce the expense of agricultural machinery by avoiding the use of two independent machines to accomplish the two functions which are performed by the single machine embodying the features of the present invention and as hereinbefore described.

What is claimed is:

1. In a machine of the class specified, a drive axle having a gear, a power transmitting shaft carrying a sprocket wheel and gear to mesh with the gear on the drive axle and mounted to have a tilting adjustment to disengage and engage the gear thereon relatively to the gear on the axle, a fertilizer distributer having an operating shaft with a sprocket wheel, a seed box having an operating shaft also provided with a sprocket wheel, a chain belt continuously engaging the sprocket wheel on the power transmitting shaft and the sprocket wheels of the fertilizer distributer and seed box shafts, cultivating devices movably mounted below the fertilizer distributer and seed box, and mechanism for elevating the cultivating devices and tilting the power transmitting shaft to throw the gear thereof out of mesh with the gear on the drive axle.

2. In a machine of the class specified, a fertilizer distributer having feed operating means, a seed box also having feed operating means, a drive axle, mechanism between the drive axle and the feed operating means of the fertilizer distributer and seed box for actuating said means, and including tilting power transmitting devices having a normal operating association with the drive axle, cultivating devices movably mounted under the fertilizer distributer and seed box, and a rock shaft having means connected to the cultivating devices for raising and lowering the latter and also provided with a shifting lever carrying means to engage a part of the mechanism between the drive axle and the operating means for the fertilizer distributer and seed box to cause a separation of said tilting power transmitting devices from the feed operating means and effect a cessation of feed of the fertilizer distributer and seed box subsequent to the elevation of the cultivating devices and to set all of the parts in operation when the cultivating devices are lowered.

3. In a machine of the class specified, a fertilizer distributer, a seed box, cultivating devices gravitatingly mounted below the fertilizer distributer and seed box, a drive shaft having gear means, mechanism between the drive shaft and fertilizer distributer and seed box for rendering the fertilizer distributer and seed box active and inactive and comprising a tilting shaft having gear means to coöperate with the gear means of the drive shaft, and mechanism for elevating and depressing the cultivating devices and by reverse movements effecting an engagement and disengagement of the gear means on the tilting shaft relatively to the gear means of the drive shaft for rendering the fertilizer distributer and seed box active and inactive to cause a feed and a cessation of feed from the fertilizer distributer and seed box simultaneously with the depression and elevation of the cultivating devices.

4. In a machine of the class specified, a fertilizer distributer having an operating shaft with a sprocket wheel, a seed box having an operating shaft with a sprocket wheel, a drive shaft carrying a gear, a tilting power transmitting shaft carrying a gear to mesh with the gear of the drive shaft and also provided with a sprocket, a chain belt engaging the sprocket wheels of the operating shafts of the fertilizer distributer and seed box and of the power transmitting shaft, cultivating devices gravitatingly mounted below the fertilizer distributer and seed box, a rock shaft having lifters provided with chains connected to the cultivating devices, and a shifting lever connected to the rock shaft and provided with means for disengaging the gear of the power transmitting shaft from the gear of the drive shaft.

5. In a machine of the class specified, a drive shaft carrying a gear, a power transmitting shaft having a gear meshing with the gear of the drive shaft and also provided with a sprocket, the said power transmitting shaft having a tilting support at one end, a fulcrumed bar engaging one end of the power transmitting shaft for tilting the latter and having a projection, a fertilizer distributer having a feed operating shaft provided with a sprocket, a seed box having a feed operating shaft provided with a sprocket, a chain belt engaging the sprocket on the power transmitting shaft and the sprockets of the operating shafts of the fertilizer distributer and seed box, cultivating devices gravitatingly mounted below the fertilizer distributer and seed box, a rock shaft having lifters provided with chains connected to the cultivating devices for simultaneously raising and lowering the latter, and a shifting lever carrying a frame having a segmental slot merging into a cam slot and engaged by the projection of the said fulcrumed bar to effect a disengagement and engagement of the gear on the power transmitting shaft relatively to the gear on the drive shaft.

6. In a machine of the class specified, a drive shaft having a gear, a power transmitting shaft carrying a gear to mesh with the gear on the drive shaft and also provided with a sprocket, a fertilizer distributer having an operating shaft with a sprocket, a seed box having an operating shaft with a sprocket, a chain belt engaging the sprockets of the said operating shafts and that on the power transmitting shaft, cultivating devices gravitatingly mounted below the fertilizer distributer and seed box, and mechanism for elevating the cultivating devices and at a proper interval disengaging the gear on the power transmitting shaft from the gear of the drive shaft and subsequently for first setting up an engagement of the gears of the drive shaft and power transmitting shaft and immediately thereafter lowering the cultivating devices into operative position.

In testimony whereof I have hereunto set my hand in presence of two subscribing witnesses.

HAYES S. SMITH.

Witnesses:
R. F. GRAHAM,
GEO. W. DRAUGHON.

Copies of this patent may be obtained for five cents each, by addressing the "Commissioner of Patents, Washington, D. C."